United States Patent [19]

Tomita

[11] Patent Number: 4,669,006
[45] Date of Patent: May 26, 1987

[54] TAPE PLAYER

[75] Inventor: Seiji Tomita, Yokosuka, Japan

[73] Assignee: Tokyo Shibaura Denki Kabushiki Kaisha, Kawasaki, Japan

[21] Appl. No.: 803,728

[22] Filed: Dec. 2, 1985

Related U.S. Application Data

[62] Division of Ser. No. 438,352, Nov. 1, 1982, Pat. No. 4,587,583.

[30] Foreign Application Priority Data

Nov. 6, 1981 [JP] Japan .................. 56-178164
Mar. 10, 1982 [JP] Japan .................. 57-37744
May 17, 1982 [JP] Japan .................. 57-82673

[51] Int. Cl.⁴ ............................ G11B 15/00
[52] U.S. Cl. ............................ 360/93; 360/96.5; 360/96.3; 242/200
[58] Field of Search ............ 360/93, 96.1-96.6, 360/71, 74.1; 242/198-201

[56] References Cited

U.S. PATENT DOCUMENTS 3,601,333  8/1971  Du Bois et al. .
3,747,941  7/1973  Lely ....................... 360/96.5
3,912,195 10/1975  Yamamoto .
4,342,058  7/1982  Osanai ..................... 360/96.5

FOREIGN PATENT DOCUMENTS 1085344  7/1960  Fed. Rep. of Germany .
2003907 11/1971  Fed. Rep. of Germany .
2221251  9/1973  Fed. Rep. of Germany .
4735961  9/1972  Japan .
56-140932 10/1981  Japan .
56-140933 10/1981  Japan .
723407  2/1955  United Kingdom .

Primary Examiner—A. J. Heinz
Attorney, Agent, or Firm—Cushman, Darby & Cushman

[57] ABSTRACT

A tape player for controlling movement of tape disposed on at least one reel of a tape cartridge, the reel defining a hole therethrough. The tape player is provided with a moving member adapted for cooperation with the hole for rotating the reel, the moving member being rotatable about an axis and slidable along the axis. A mechanism rotates the moving member. The rotating mechanism and the moving member are coupled together when the moving member is slid in one direction. As a result, the tape player is operated by the moving member passing through the hole.

2 Claims, 37 Drawing Figures

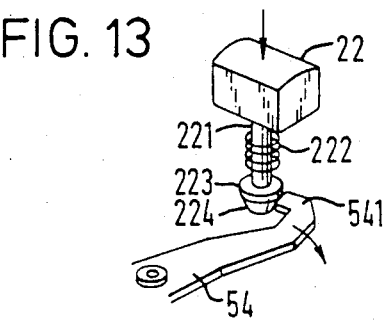
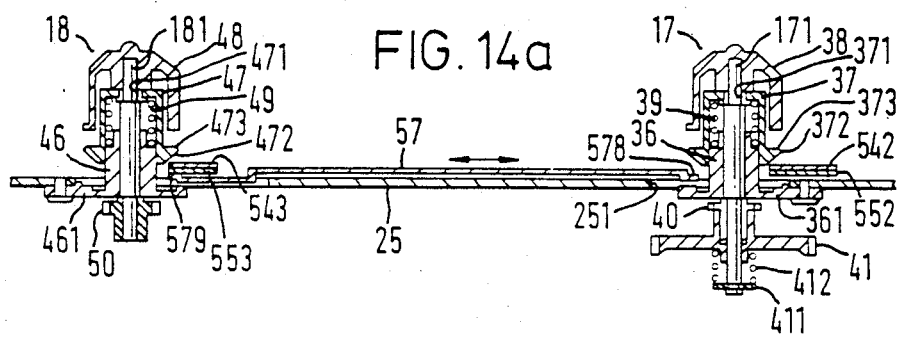
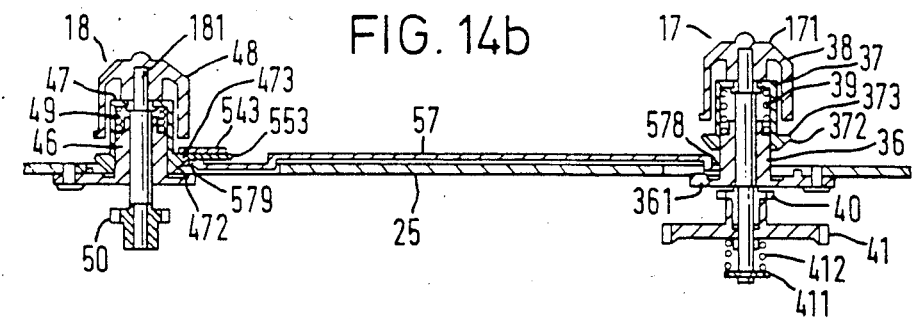

FIG. 15
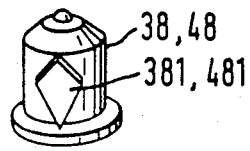
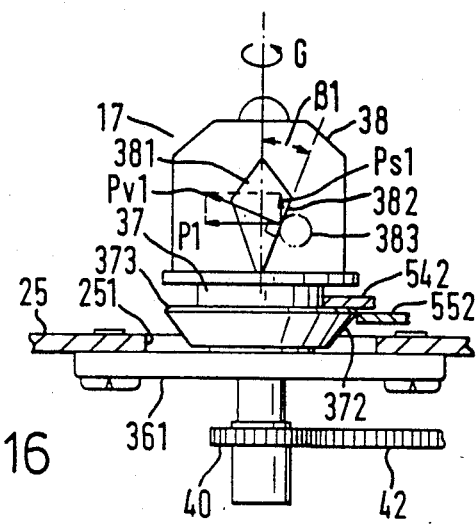
FIG. 16
FIG. 17a
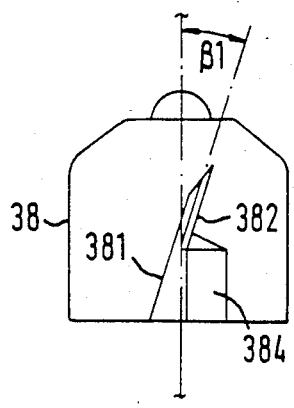
FIG. 17b
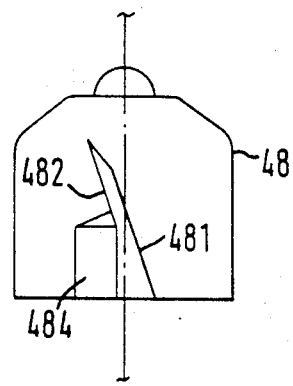
FIG. 17c
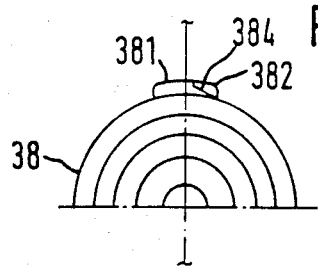

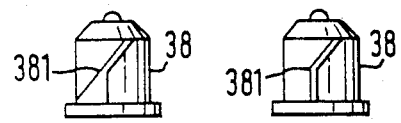
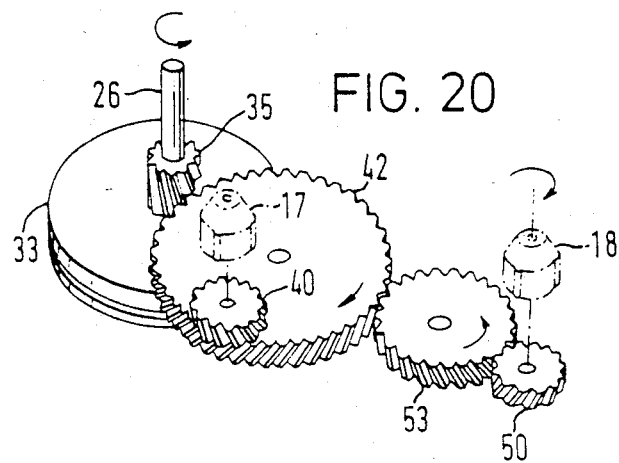
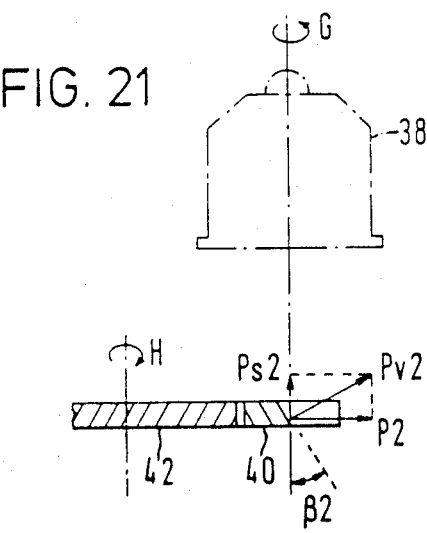

TAPE PLAYER

This is a division of application Ser. No. 438,352, filed Nov. 1, 1982, now U.S. Pat. No. 4,587,583.

FIELD OF THE INVENTION

This invention relates to a tape player, and more particularly, to a tape player for playing cartridge type tapes which utilizes a particularly simple mechanism.

Small sized, lightweight, and thus portable, tape players have recently become popular, particularly ones which are stereo and for playback exclusively with headphones. Thus, the user can enjoy listening to tapes while wearing the headphones and, for example, walking around. Such portable tape players of the type exclusively intended for use with headphones have already been reduced in size as far as possible. At present, they are about the same size as the cartridge case which holds the tape cartridge.

When a tape player is miniaturized to about the same size as the cartridge case, it is particularly important to simplify its construction and improve its operability and convenience in use by improving the mechanism for driving the tape and the arrangement of the various operating elements which may be actuated to operate the tape player in its various modes of operation, such as playback, fast forward, rewind, and stop. More specifically, the operating elements of existing small tape players are also small in size, in proportion to the tape player itself, and are concentrated in one place as required by the tape player mechanism. This, of course, makes them difficult to operate and increases the risks of erroneous operation. Further, the tape drive mechanisms are complicated. Thus, a need exists for the operating elements to be large enough to be easily operated by the user and comfortably separated from each other so that neighboring elements are not unintentionally operated. This would result in a tape player that is not only conveniently portable which also has excellent operability and wherein there is no risk of erroneous operation.

Apart from simply playing a tape, some such small tape players can receive radio transmissions. This is achieved by use of a tuner unit (hereinafter referred to as a "tuner pack"), which accommodates the tuner circuit portion for receiving, tuning, detecting and amplifying radio waves, in a casing of approximately the same shape as the tape cartridge. The tuner pack is designed to fit in the tape player in place of a tape cartridge. A development along the lines of the requirements already mentioned is also urgently required for such small tape players capable of using a tuner pack.

SUMMARY OF THE INVENTION

It is, therefore, an object of the present invention to provide a tape player which is of simple construction.

Another object of the present invention is to provide a tape player with improved operability.

A further object of the present invention is to provide a tape player in which construction is highly integrated without useless parts.

A still further object of the invention is to provide a tape player having an effectively small size.

According to one aspect of the present invention, the tape player includes a moving member adapted for cooperation with a hole for rotating a reel of tape. The member is rotatable about its axis and slidable along its axis. A drive mechanism is provided for rotating the moving member. The rotating means and the moving member are coupled when the moving member is slid in one direction.

Additionally or atlernately, the cartridge tape may be disposed in the housing defining a guide hole therethrough about which the reel of tape is not disposed. The tape player may then include an assemble for preventing tape in the cartridge from being driven in response to manual actuation of a member included in the assembly which extends through the guide hole in the cartridge tape. According to this approach also, the tape player may be controlled in a convenient manner.

BRIEF DESCRIPTION OF THE DRAWINGS

Additional objects and advantages of the present invention will become apparent to persons skilled in the art from the following detailed description and the accompanying drawings, of which:

FIG. 13 is a perspective view showing details of the stop operating element;

FIGS. 14a and 14b are views given for explanation of the action of the stop slider;

FIG. 15 and FIG. 16 are a perspective view and a side view showing the shape and operation of the reel cap blade in one embodiment of a cassette tape player;

FIGS. 17a to 17c, FIG. 18 and FIGS. 19a and 19b are side views showing other possible shapes of the reel cap blades;

FIG. 20 is a perspective view showing the shape of the gearwheels of the tape player mechanism;

FIG. 21 is a side view showing the action of these gearwheels;

FIG. 27 is a front view showing a tape player which is modified from that of FIG. 1a;

DESCRIPTION OF THE PREFERRED EMBODIMENT

The present invention will be described in detail with reference to the accompanying drawings. Throughout the drawings, like reference letters and numerals will be used to designate like or equivalent elements.

Figure 1A:
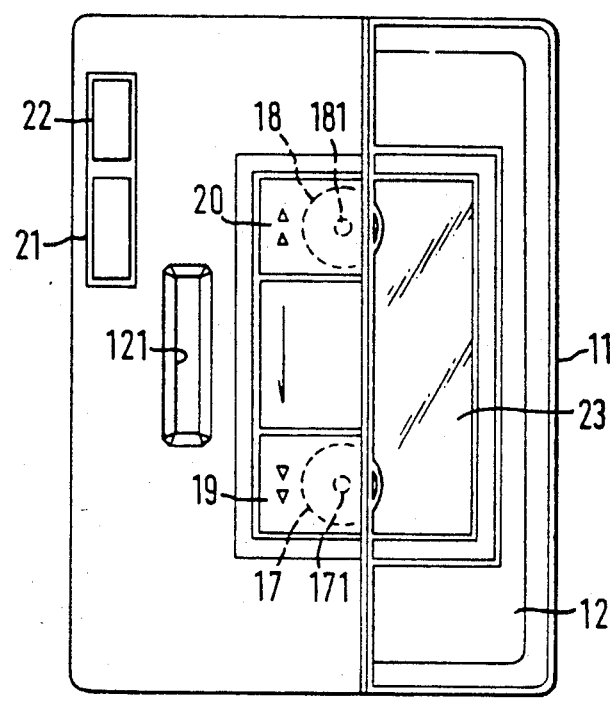
FIGS. 1a and 1b are a front view and a side view showing a tape player to which the present invention has been applied.
Figure 1B:
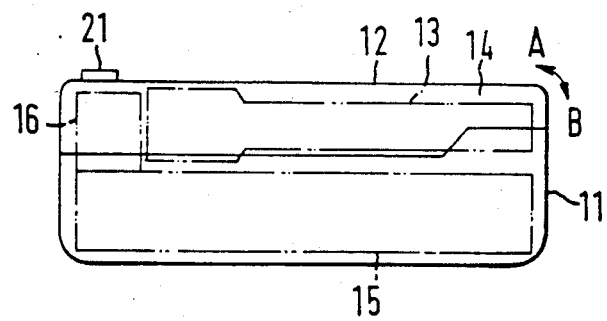

FIG. 1a and FIG. 1b, respectively, are a front view and a side view of a tape player to which this invention has been applied. Casing or cabinet 11 is formed of approximately the same size in its front view as a cartridge case, for example, a cassette case, which holds a tape cassette. One surface of cabinet 11 forms lid 12 for covering the tape cassette loaded in cabinet 11. Lid 12 is supported in such a way that it may be opened or closed by being rotated in the directions of the arrows A and B in FIG. 1b. Lid 12 is biased at both the open and the closed positions toward those positions so that it does not rattle. Lid 12 is provided with a cassette holder which will be described in detail later. The cassette holder can pivot similar to the opening and the closing actions of lid 12, and can hold a tape cartridge, for example, tape cassette 13 indicated by the double-dotted chain lines in FIG. 1b.

Cabinet 11 contains mechanism accommodating portion 15 in which tape cassette holding portion 14 is capable of accommodating tape cassette 13 when lid 12 is closed, and the tape player mechanism, circuitry, and battery holder, etc. Head unit 16 is also arranged inside cabinet 11 opposite the exposed face of tape cassette 13 and is equipped with a playback head and pinch roller etc., to be described later. Both head unit 16 and the cassette holder are linked for coordinated movement with the opening and the closing operation of lid 12.

As shown in FIG. 1a, a pair of reel shafts 17 and 18, upon which a pair of reel hubs (not shown) of tape cassette 13 may be positioned, are supported in tape cassette holding portion 14. Fast forward operating element 19 and rewind operating element 20 are respectively arranged at positions corresponding to reel shafts 17 and 18 on lid 12, so as to be over rotary shafts 171 and 181 of reel shafts 17 and 18. Fast forward and rewind operating elements 19 and 20 are positioned so as to be capable of axially depressing rotary shafts 171 and 181, to be described later, of reel shafts 17 and 18.

Playback operating element 21 and stop operating element 22 are also arranged on lid 12, to be depressed substantially perpendicularly to the plane of lid 12. These elements 21 and 22 are arranged in positions over head unit 16, i.e., not over a surface of tape cassette 13. Window 23 is positioned in approximately the center of lid 12. Window 23 is formed, for example, of a transparent acrylic sheet and is positioned to at least partially overlap the well known transparent tape window formed in the surface of tape cassette 13. Also, the right end in FIG. 1a of window 23 overlaps a part of reel shafts 17 and 18, so that the running condition of the tape can be seen from outside through window 23. To increase the visibility of the running condition of the tape, fast forward and rewind operating elements 19 and 20 can be made of transparent material.

Tapered slot 121 in lid 12 expands outwardly from tape cassette holding portion 14, in a position between fast forward and rewind operating elements 19 and 20 and playback and stop operating elements 21 and 22. Slot 121 is provided so that when using a tuner pack in place of tape cassette 13, stations may be selected. Thus, apart from being able to play tapes, radio transmission can also be received using the tuner pack. This is achieved by using the tuner pack which accommodates a tuner circuit unit for receiving, tuning, detecting and amplifying radio waves. The tuner pack is in a casing of approximately the same shape as tape cassette 13 and fits into tape cassette holding portion 14 in place of tape cassette 13. Tuning is accomplished by a control provided on the tuner pack to enable selection of a desired station. The received and amplified radio waves are fed from the tuner pack to a main amplifier circuit in the in the tape player through connection terminals, and reproduced by headphones. Since lid 12 is in a closed condition, the tuning selector projects to the outside through slot 121, so that tuning can be carried out without opening lid 12. A volume controller, a tape type (normal, chrome, metal, etc.) changeover switch and a headphone jack etc., are arranged on the side of cabinet 11, though not shown in the drawing.

Figure 2:
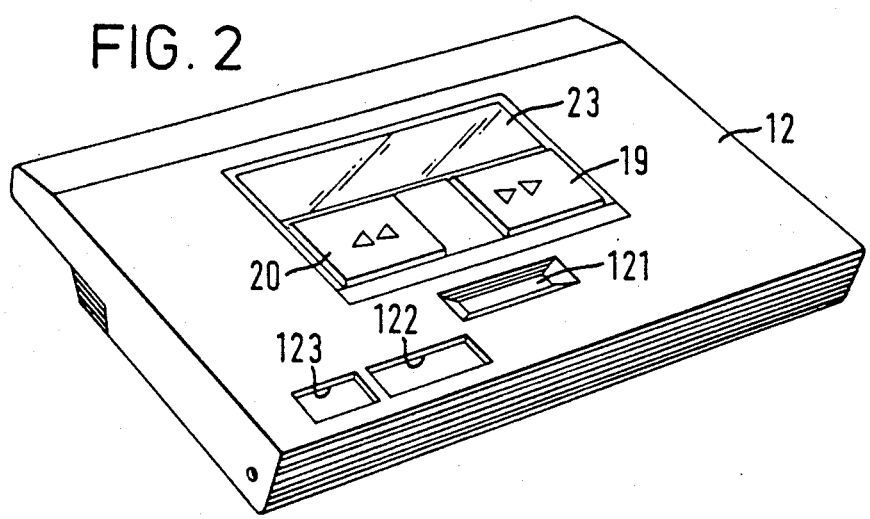
FIG. 2 is a perspective view showing the lid of the tape player.
Figure 3:
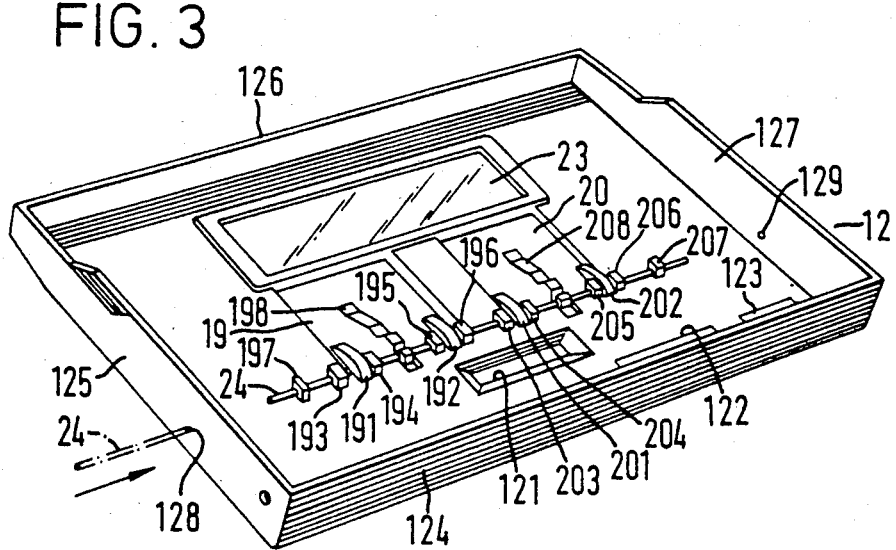
FIG. 3 is a perspective view showing how the fast-forward and rewind operating elements are mounted on the underside of the lid.

In FIG. 2, lid 12 has been removed from cabinet 11. Holes 122 and 123 are provided in lid 12 through which playback operating element 21 and stop operating element 22 may project. As shown in FIG. 3, lid 12 includes four side portions 124 to 127. These portions 124 to 127 form side faces of cabinet 11. Fast forward and rewind operating elements 19 and 20 are approximately rectangular-shaped and extend through holes (not visible in FIG. 3) formed in lid 12. Bearings 191, 192 and 201, 202 are formed on the undersurfaces of fast forward and rewind operating elements 19 and 20. Further, bearings 193 and 194, and 195 and 196 are formed adjacent to bearings 191 and 192. Similarly, bearings 203 and 204, and 205 and 206 are also formed on either side of bearing parts 201 and 202. Thus, all bearings 191 to 196 and 201 to 206 are arranged on the same straight line. Holes 128 and 129 are respectively formed in side portions 125 and 127 of lid 12, at positions corresponding to the two ends of this line.

As shown in FIG. 3 by the dotted line, support shaft 24 is inserted from outside into hole 128 in side portion 125 of lid 12. Fast forward and rewind operating elements 19 and 20 are supported on lid 12 by support shaft 24 passing through bearings 191 to 196 and 201 to 206. Both ends of support shaft 24 are supported by bearings 197 and 207 formed on the underside of lid 12.

Fast forward and rewind operating elements 19 and 20 are rotationally biased outwards from lid 12 about support shaft 24 by means of leaf springs 198 and 208, one end of each of which is supported on support shaft 24, and the other end of each of which presses against the central portion of one of the fast forward and rewind operating elements 19 and 20. However, this portion is checked by abutment elements (not-shown) which are formed on the periphery of the holes of lid 12 through which fast forward and rewind operating elements 19 and 20 are inserted, and the edges of fast forward and rewind operating elements 19 and 20 themselves. Thus, fast forward and rewind operating elements 19 and 20 are biased downwards in FIG. 2 against the force of leaf springs 198 and 208. When fast forward and rewind operating elements 19 and 20 are manually operated by being further depressed, the undersides of fast forward and rewind operating elements 19 and 20 respectively move rotary shafts 171 and 181 of reel shafts 17 and 18 in their axial directions.

Figure 4:
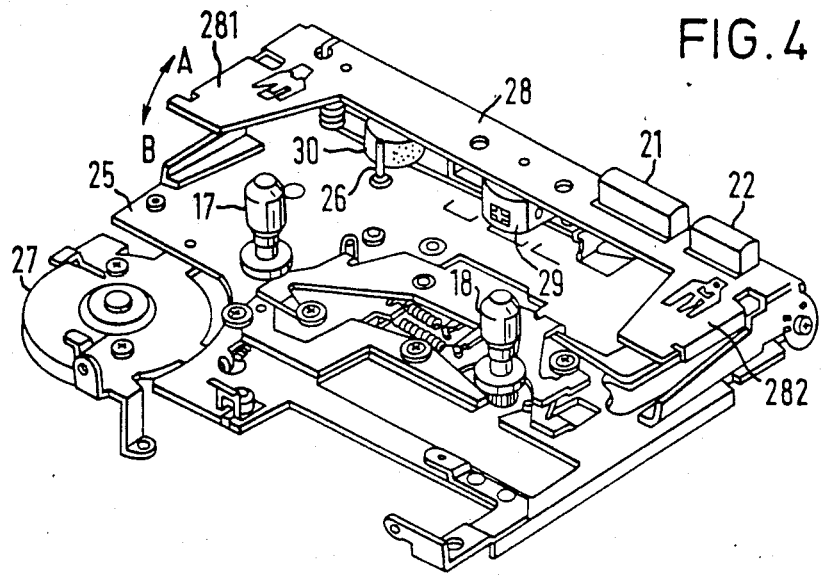
FIG. 4 is a perspective view showing the mechanism of the tape player, and the external appearance of the head, unit and cassette holder.

FIG. 4 is an overall external view of the tape player mechanism including head unit 16 and cassette holder 28 etc., that are installed in mechanism accommodating unit 15. Main chassis 25 of the tape player mechanism supports reel shafts 17 and 18 so that they are free to rotate and free to slide in their axial direction. Capstan 26, which is the shaft of a flywheel as described later, and motor 27, which is operably connected to reel shafts 17 and 18 and capstan 26, are supported on main chassis 25 together with reel shafts 17 and 18. Cassette holder 28 is supported at one end of main chassis 25 so that cassette holder 28 is able to rotate in the directions of the arrows A and B in FIG. 4. Holding elements 281 and 282 are formed on cassette holder 28 at opposite ends thereof, so as to hold both end portions of tape cassette 13 (not shown). Playback head 29 and pinch roller 30, to be brought into contact with or moved away from capstan 26, are supported in approximately the central portion of cassette holder 28. Playback and stop operating elements 21 and 22 are also supported on cassette holder 28.

Figure 5:
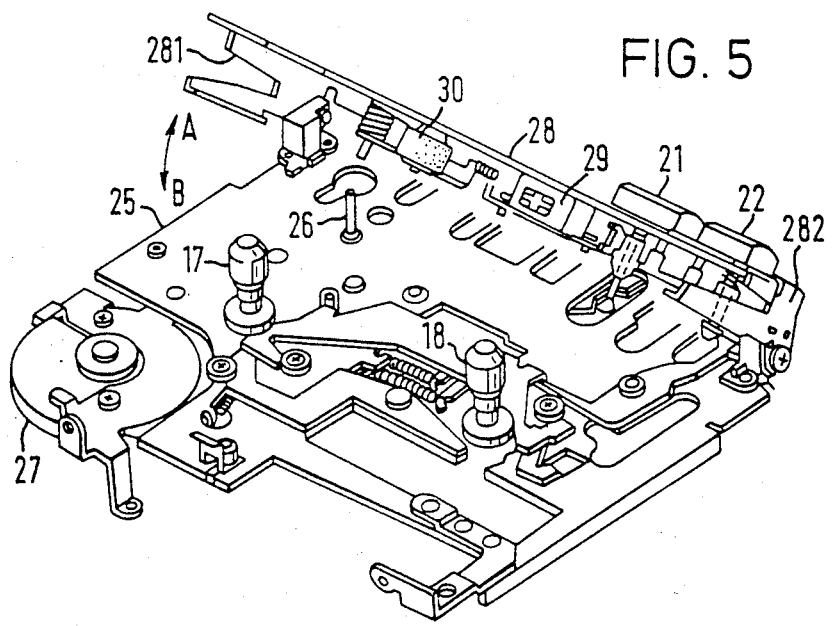
FIG. 5 is a perspective view showing the cassette holder of FIG. 4 in its open condition.

Lid 12 is fitted to cassette holder 28 so as to cover it. Playback and stop operating element 21 and 22 are then available for operation from the outside, after being inserted through holes 122 and 123 (see FIG. 2) formed in lid 12. When lid 12 is opened, cassette holder 28, moving conjointly with lid 12, is rotated in the direction of the arrow A in FIG. 4, so as to assume the position shown in FIG. 5. Playback head 29, and pinch roller 30 are shifted together with cassette holder 28.

The detailed construction of the tape player mechanism and head unit 16 will now be explained. As seen from FIG. 6, playback operating element 21 (indicated by a double-dotted line in the lower part of the drawing) on main chassis 25 is supported on cassette holder 28 (not shown in FIG. 6). Head chassis 31 is supported on cassette holder 28 on the right of playback operating element 21 on the drawing, by means of shaft 311. Shaft 311 supports head chassis 31 so that head chassis 31 is able to freely rotate in the direction of the arrows C and D in FIG. 6. Playback head 29 is mounted at the left end of head chassis 31 in the drawing. One end of pinch lever 301 is freely rotatably supported on shaft 311. Pinch roller 30 is also freely rotatably supported on the other end of pinch lever 301.

Figure 6:
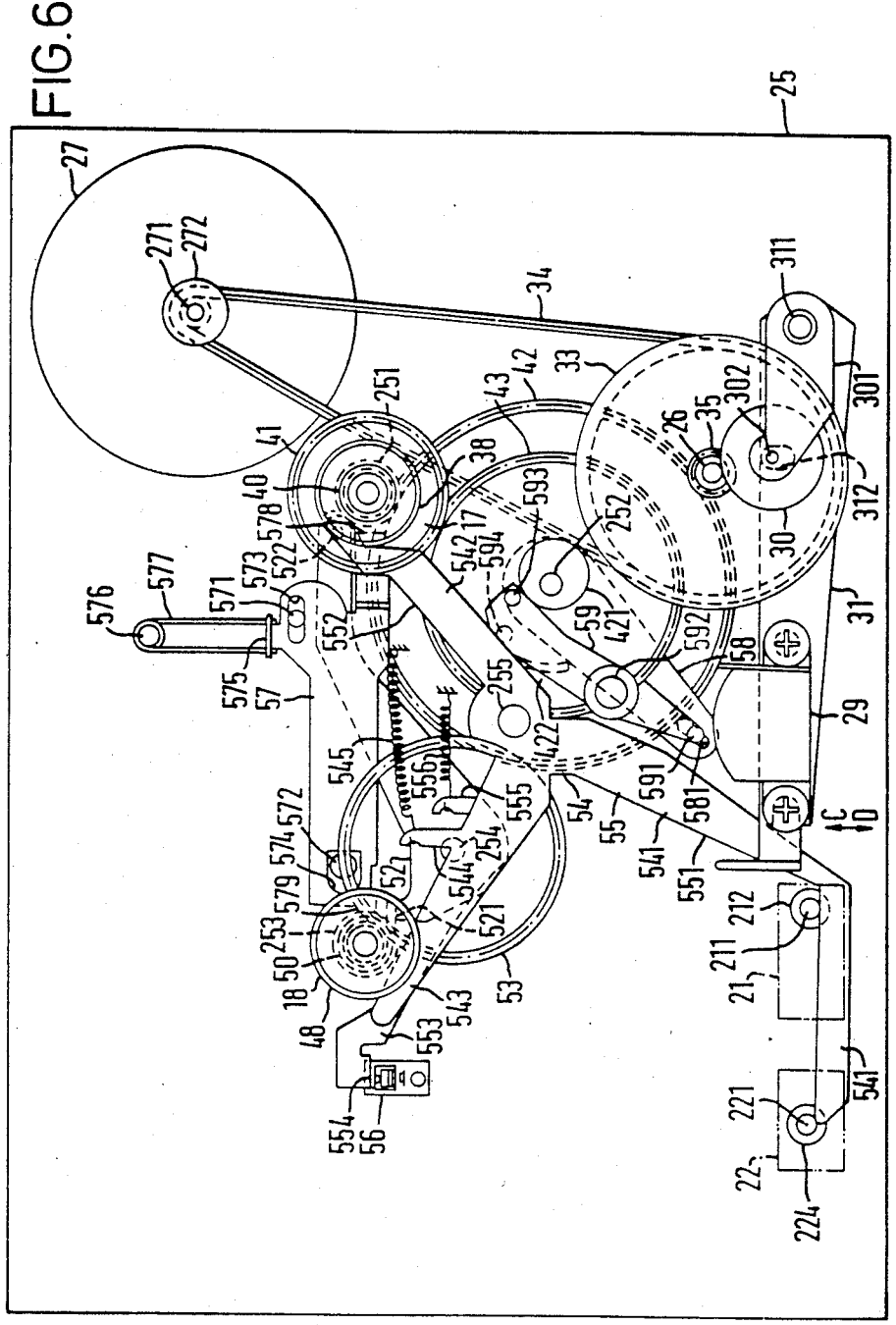
FIG. 6 is a view showing details of the construction of the tape player mechanism.

Head chassis 31 is biased for rotation in the direction of the arrow D in FIG. 6, about shaft 311, by means of a torsion spring (not shown), one end of which abuts the side of head chassis 31, and the other end of which is abutted by cassette holder 28, the torsion spring being wound around shaft 311. Pinch lever 301 is biased for rotation in the direction of the arrow C in the drawing about shaft 311 by means of a coil spring (not shown), which extends between pinch lever 301 and head chassis 31. Shaft 302 of pinch roller 30 freely fits into slot 312 formed in head chassis 31. The rotation of pinch lever 301 due to the coil spring in the direction of the arrow C in the drawing therefore continues until shaft 302 abuts the upper end in the drawing of slot 312.

Figure 7:
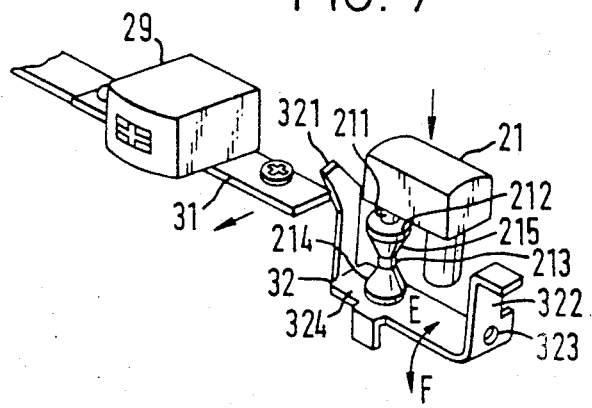
FIG. 7 is a perspective view showing the relationship between the playback operating element and the head unit.

As shown in FIG. 7, abutment portion 321 extending from one end of playback drive member 32 abuts the lower left end in FIG. 6 of head chassis 31. Playback drive member 32 is supported so that playback drive member 32 is free to rotate in the directions of the arrows E and F in the drawing, by means of a shaft (not shown), which is inserted into hole 323 formed in mounting portion 322 extending from the other end of playback drive member 32. The shaft for supporting playback drive member 32 projects from main chassis 25. Playback operating element 21 referred to earlier is supported on cassette holder 28 in position above playback drive member 32, in such a way that playback operating element 21 is free to slide in the vertical direction in the drawing, and prevented from coming out by being slid upwards in FIG. 7.

Playback operating element 21 has operating shaft 211 extending downwards from the lower portion of playback operating element 21. First drive portion 212, mounted on shaft 211, has a surface shaped approximately in a cone. The pointed portion of first drive portion 212 is joined through shaft 213 to the pointed portion of second drive portion 214 which also has an approximately conical surface. The base surface of second drive portion 214 faces a surface 324 of playback drive member 32.

Consequently, the rotation of head chassis 31 in the direction of the arrow D in FIG. 6 due to the torsion spring for biasing head chassis 31 continues and the free end of head chassis 31 depresses abutment portion 321 of playback drive member 32. Playback drive member 32 is caused to rotate in the direction of the arrow E in FIG. 7 so that base portion 324 of playback drive member 32 depresses the base surface of second drive portion 214. Then, playback operating element 21 slides upwards in the drawing, until further rotation of playback drive member 32 is prevented.

Figure 8:
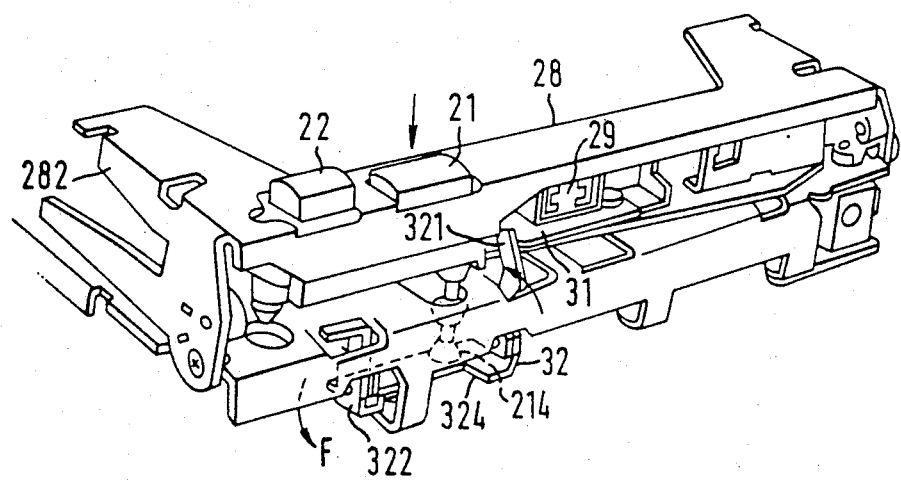
FIG. 8 is a perspective view showing the playback operating element as depressed.

Let us now assume that playback operating element 21 is depressed, as shown in FIG. 8. When this happens, the base surface of second drive portion 214 depresses base portion 324 of playback drive member 32. Playback drive member 32 is caused to rotate in the direction of the arrow F in FIG. 8. As a result, abutment portion 321 of playback drive member 32 depresses the free end of head chassis 31 against the biasing force of the torsion spring for biasing head chassis 31, and head chassis 31 is thereby rotated in the direction of the arrow C in FIG. 6. At this time, playback head 29 is brought into contact with a tape (not shown) of tape cassette 13. Pinch roller 30 is also pressed against capstan 26, with the tape interposed. Pinch roller 30 is positioned such that pinch lever 301 is pressed back in the direction of the arrow D in FIG. 6 about shaft 311 against the biasing force of the coil spring which biases pinch lever 301 for rotation in the direction of the arrow C in FIG. 6, when pinch roller 30 presses against capstan 26. Playback operating element 21 is locked in the depressed position shown in FIG. 8 (the locking mechanism will be described hereinafter).

Again as shown in FIG. 6, motor 27 is mounted in the upper right-hand region in the drawing of main chassis 25. A small-diameter pulley 272 is mounted on shaft 271 of motor 27. Flywheel 33 is freely rotatably supported in the bottom right-hand region in the drawing of main chassis 25. Flywheel 33 and pulley 272 are connected through belt 34 so that a turning force is transmitted between them. The rotary shaft of flywheel 33 is capstan 26 as mentioned above. Capstan 26 is provided with small-diameter gearwheel 35 in a position on flywheel 33 coaxially therewith, as shown in FIG. 9.

Figure 9:
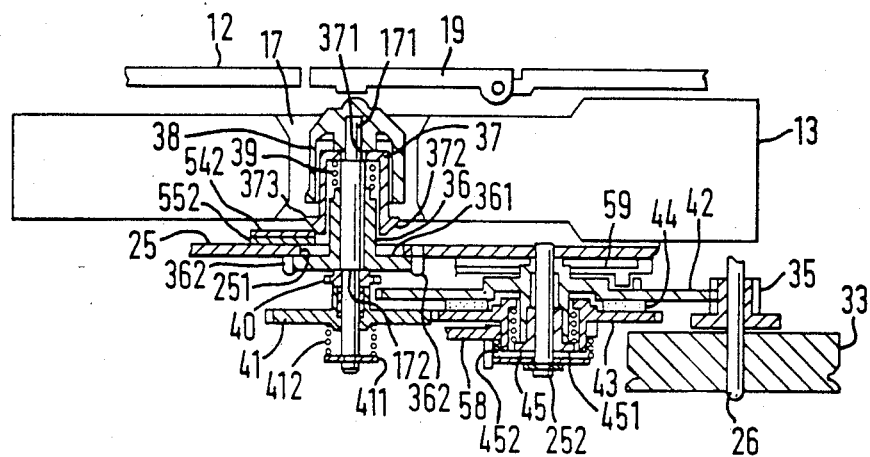
FIG. 9 to FIG. 12 are views given for explanation of the action of the tape player mechanism.

As shown in FIG. 9, a pair of reel shafts 17 and 18 are provided in approximately the center of main chassis 25 (reel shaft 18 is not seen since it is located in back of reel shaft 17). Reel shaft 17 which takes up the tape during a fast forward operation is supported on main chassis 25. This is achieved by the provision of hole 251 in the region where reel shaft 17 is to be mounted on main chassis 25. Bearing member 36, which is approximately cylindrical in shape is inserted into hole 251. Bearing member 36 is provided with flange portion 361 under main chassis 25 having a larger diameter than that of hole 251. Flange portion 361 of bearing member 36 is fitted to main chassis 25 around hole 251, by means of screws 362. Rotary shaft 171 of reel shaft 17 is freely rotatably positioned within bearing member 36.

Rotary shaft 171 projects upwards in the drawing from bearing member 36. The projecting portion of rotary shaft 171 fits into reel cap 38 after passing through hole 371 formed in a base portion of locking member 37. Locking member 37 is approximately cylindrical. Reel cap 38 rotates in a unitary manner with rotary shaft 171, but locking member 37 is independent of the rotation of rotary shaft 171. Coil spring 39 is provided between the upper end in the drawing of bearing member 36 and the base portion of locking member 37, so that rotary shaft 171 is biased upwards in the drawing.

Locking member 37 is provided with abutment portion 373 having tapered surface 372 which widens from the bottom in the drawing to the top. Abutment portion 373 is formed of smaller diameter than that of hole 251 of main chassis 25.

Rotary shaft 171 projects further downward in the drawing from bearing member 36. The downward projecting portion of rotary shaft 171 is provided with step 172 to reduce its diameter. Small diameter gearwheel 40 and larger diameter gearwheel 41 are respectively fitted onto the smaller diameter portion of rotary shaft 171. These gearwheels 40 and 41 rotate in a unitary manner with rotary shaft 171. Gearwheel 40 is fixed to rotary shaft 171, but gearwheel 41 is axially slidably arranged on rotary shaft 171. Gearwheel 41 is biased upwards in the drawing by means of coil spring 412 provided between gearwheel 41 and washer 411 mounted at the bottom end of rotary shaft 171. However, the upward movement of gearwheel 41 is limited by gearwheel 40.

Shaft 252 is provided on main chassis 25 approximately midway between reel shaft 17 and flywheel 33. From the top in FIG. 9, larger diameter gearwheel 42 and smaller diameter gearwheel 43 are respectively freely rotatably supported on shaft 252. Ring-shaped friction member 44 is provided between gearwheels 42 and 43. At the bottom portion in the drawing of shaft 252, there is fitted cylindrical stop member 45. Stop member 45 is provided with flange portion 451 at its lower end in the drawing. Gearwheel 43 is pressed against gearwheel 42 through friction member 44 by means of coil spring 452 provided on flange portion 451 of stop member 45. Consequently, gearwheels 42 and 43 are operatively connected for common movement. Gearwheel 42 is in mesh with gearwheel 35 of flywheel 33, and gearwheel 43 is in mesh with gearwheel 41 of reel shaft 17. Gearwheel 42 is then in a position in which gearwheel 42 would mesh with gearwheel 40 on reel shaft 17, but there is a vertical gap between these gearwheels 42 and 40 as seen from FIG. 9, so that these gearwheels 42 and 40 fail to mesh with each other.

Figure 10:
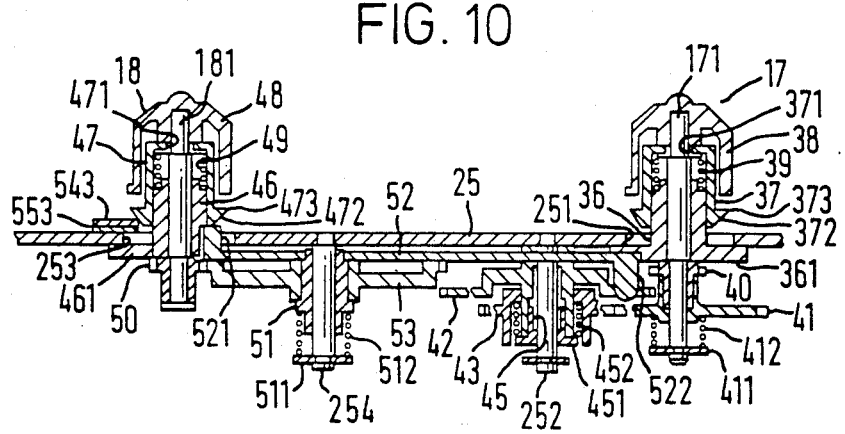

Reel shaft 18 which takes up the tape during rewind operation is supported by main chassis 25, as shown in FIG. 10. Specifically, hole 253 through which reel shaft 18 is mounted is formed in main chassis 25. Bearing member 46 of approximately cylindrical shape is inserted through hole 253 and has flange portion 461 in its lower region in the drawing. Flange portion 461 extends beyond hole 253, and is fixed to chassis 25 by means of screws or the like (not shown).

Rotary shaft 181 is freely rotatably inserted into bearing member 46, and projects upwards in the drawing beyond bearing member 46. The projecting portion of rotary shaft 181 is fixed to reel cap 48 after passing through hole 471 formed in a base portion of cylindrical locking member 47. Reel cap 48 rotates with rotary shaft 181, but locking member 47 is independent of the rotation of rotary shaft 181. Coil spring 49 is provided between the upper end in the drawing of bearing member 46 and the base portion of locking member 47, so that rotary shaft 181 is biased upwards in the drawing.

Locking member 47 is provided with abutment portion 473 having tapered surface 472 which widens from the bottom in the drawing to the top. Abutment portion 473 is formed of smaller diameter than that of hole 253 in main chassis 25.

Smaller diameter gearwheel 50 is fitted to a portion of rotary shaft 181 which projects downwards in the drawing from bearing member 46. Gearwheel 50 rotates with rotary shaft 181.

Shaft 254 is provided on main chassis 25 approximately midway between reel shaft 18 and shaft 252. Bearing member 51 of approximately cylindrical shape is provided on shaft 254 in such away that bearing member 51 is freely rotatable and also freely slidable along the direction of shaft 254, i.e., in the vertical direction in the drawing. Rewind lever 52 and gearwheel 53 are fitted onto bearing member 51. Coil spring 512 is provided between the lower end in the drawing of bearing member 51 and washer 511, which is fitted onto the lower part in the drawing of shaft 254. Bearing member 51 is thus biased upwards in the drawing, and in this condition gearwheel 53 meshes with gearwheel 50 of reel shaft 18. Gearwheel 53 is then in a position in which gearwheel 53 would mesh with gearwheel 42, but gearwheels 53 and 42 are vertically offset, as seen from FIG. 10, so that gearwheels 53 and 42 fail to mesh with each other.

Rewind lever 52 is flat. At its end positioned between the meshing parts of gearwheels 53 and 50 and the lower end in the drawing of locking member 47, link portion 521 is formed which is inserted through hole 253 of main chassis 25. The other end of rewind lever 52 extends to reel shaft 17, where its tip end, in the direction of its extension, is formed with abutment portion 522. Abutment portion 522 abuts a flat portion of gearwheel 41 of reel shaft 17, from above in the drawing.

Again referring to FIG. 6, rotary shaft 255 is provided in approximately the center of main chassis 25. Locking lever 54 and switch lever 55 are freely rotatably supported on rotary shaft 255.

As shown in FIGS. 6, 9 and 10, locking lever 54 is provided with first to third abutment portions 541 to 543, which respectively are capable of abutment with taper portion 215 of first drive portion 212 of playback operating element 21, taper portion 372 of locking member 37 of reel shaft 17 and taper portion 472 of locking member 47 of reel shaft 18. These abutment portions 541 to 543 spread out in three directions about rotary shaft 255.

Switch lever 55 is of approximately the same shape as locking lever 54, and is arranged so as to overlap locking lever 54. Switch lever 55 is also provided with first to third abutment portions 551 to 553, which are capable of respective abutment with taper portions 215, 372 and 472 of playback operating element 21, and reel shafts 17 and 18. These abutment portions extend in three directions about rotary shaft 255. At a tip end of third abutment portion 553 of switch lever 55, there is formed fourth abutment portion 554 which abuts leaf switch 56 for supplying power to motor 27. Thus, when switch lever 55 is rotated in the counterclockwise direction in FIG. 6, leaf switch 56 is subjected to pressure by fourth abutment portion 554, thus becoming ON, so that motor 27 is activated.

Projecting abutment portion 555 is formed on one side of third abutment portion 553 of switch lever 55. Coil spring 556 is provided between projecting abutment portion 555 and a prescribed position on main chassis 25, thus biasing switch lever 55 to rotate in the clockwise direction in FIG. 6. First to third abutment portions 551 to 553 of switch lever 55 are thereby pressed against taper portions 215, 372 and 472.

Further projecting abutment element 544 is formed on one side of third abutment portion 543 of locking lever 54. Coil spring 545 is provided between projecting abutment element 544 and a prescribed position on main chassis 25, thus biasing locking lever 54 for rotation in the clockwise direction in FIG. 6. First to third abutment portions 541 to 543 of locking lever 54 are thereby pressed against taper portions 215, 372 and 472. Shafts 571 and 572 are provided on main chassis 25 in the neighborhood of reel shafts 17 and 18. Shafts 571 and 572 are freely fitted into slots 573 and 574 formed in opposite ends of stop slider 57 which is arranged transversely in FIG. 6 between two reel shafts 17 and 18. Stop slider 57 is therefore free to slide in the left and right directions in FIG. 6.

Projecting abutment element 575 is formed on one side of stop slider 57. Shaft 576 projects from main chassis 25 at the upper part in FIG. 6 of projecting abutment elements 575 of stop slider 57. Torsion spring 577 is wound about shaft 576 and fixed at approximately its middle to shaft 576. Both ends of torsion spring 577 is clamped by two side portions of projecting abutment elements 575. Thus, whether stop slider 57 is slid to the left or to the right in FIG. 6, stop slider 57 returns to its intermediate position. In this intermediate position, projection 578 formed on one end of stop slider 57 is positioned in the neighborhood of taper portion 372 of locking member 37 of shaft 17. In addition, projection 579 formed on the other end of stop slider 57 is positioned in the neighborhood of taper portion 472 of locking member 47 of reel shaft 18.

Let us now assume that, in the construction as described above, playback operating element 21 is operated to play a tape. When this happens, head chassis 31 explained above with reference to FIGS. 6 and 7 is shifted. This causes playback head 29 to come into contact with the tape, and pinch roller 30 to be pressed against capstan 26 through the intermediary of the tape. By pressing playback operating element 21 downwards in FIG. 7, first abutment portions 541 and 551 of locking lever 54 and switch lever 55 are pressed downwards by taper portion 215 of first drive portion 212 of playback operating element 21. Locking lever 54 and switch lever 55 are therefore rotated counter clockwise in FIG. 6 against the biasing force of springs 545 and 556. Thus, when playback operating element 21 is operated by being pressed down to the position shown in FIG. 8, first abutment portion 541 of locking lever 54 is opposite the base surface of first drive portion 212. Locking lever 54 is therefore rotated in the clockwise direction in FIG. 6 by the biasing force of spring 545, with the result that first abutment portion 541 of locking lever 54 abuts the base surface of first drive portion 212, thus locking playback operating element 21 in its depressed position. Switch lever 55 is then depressed by taper portion 215, and first abutment portion 551 is kept pressed down by first drive portion 212. Fourth abutment portion 554 of switch lever 55 therefore puts leaf switch 56 in an ON condition, causing motor 27 to be driven in the counterclockwise direction in FIG. 6.

Thus, flywheel 33 is rotated in the same direction, and its turning force is transmitted to reel cap 38 through gearwheels 35 and 42, friction member 44, gearwheels 43 and 41 and rotary shaft 171, causing reel cap 38 to rotate in the counterclockwise direction in FIG. 6, so that the tape is played.

Figure 11:
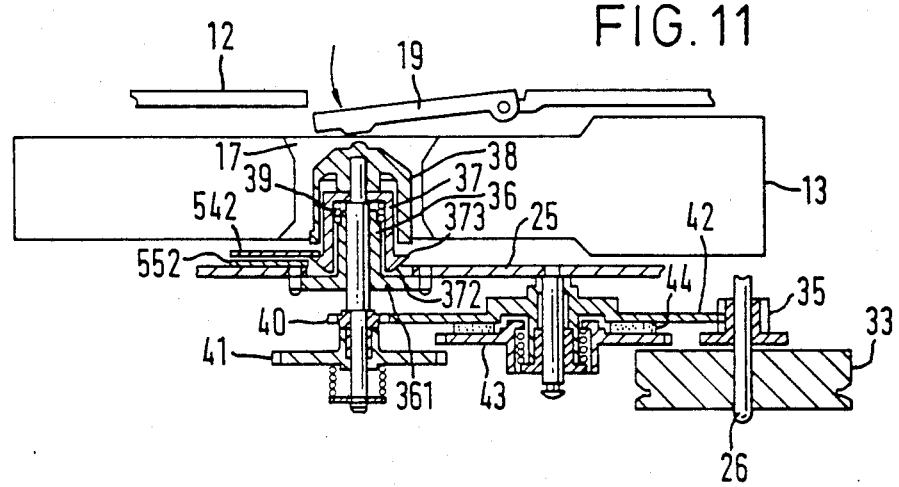

Let us now assume that fast forward operating element 19 is depressed, as shown in FIG. 11, to perform fast forward operation of the tape. When this happens, reel cap 38 of reel shaft 17 is depressed downwards in the drawing, and locking member 37 is slid downwards in the drawing against the biasing force of spring 39. This downwards movement in the drawing of locking member 37 occurs until its lower end in the drawing comes into contact with flange portion 361 of bearing member 36. Thus, in this condition, second abutment portion 552 of switch lever 55 is depressed by taper portion 372 of locking member 37, and switch lever 55 is thereby rotated in the counterclockwise direction in FIG. 6, while second abutment portion 542 of locking lever 54 abuts stop portion 373 of locking member 37. Consequently, leaf switch 56 is put in the ON condition, and reel shaft 17 is locked in its depressed, i.e., operated position.

With this depression of reel shaft 17, rotary shaft 171 is also then lowered downwards in the drawing, and gearwheels 40 and 41, which are mounted on rotary shaft 171, are also shifted in the same direction. The result of this is that gearwheel 41 comes out of mesh with gearwheel 43, and gearwheel 40 comes into mesh with gearwheel 42. Consequently, the turning force of flywheel 33 in the counterclockwise direction in FIG. 6 is transmitted to reel cap 38 through gearwheels 35, 42 and 40, and rotary shaft 171. Reel cap 38 is therefore rotated at high speed in the counter-clockwise direction in FIG. 6, so that fast forward operation of the tape occurs.

Figure 12:
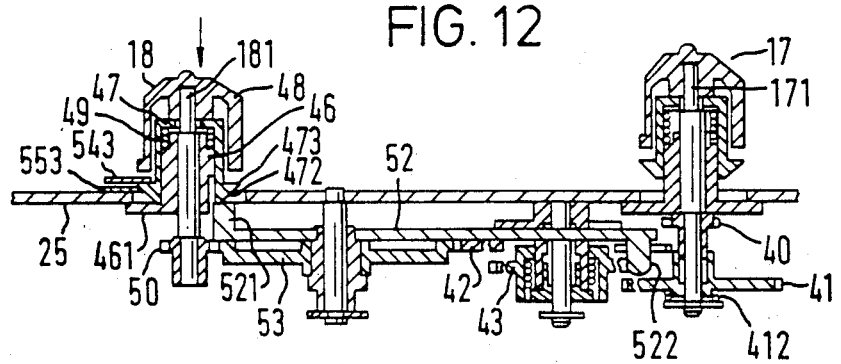

Let us now assume that rewind operating element 20 is depressed, to rewind the tape. When this happens, as shown in FIG. 12, reel cap 48 of reel shaft 18 is depressed downwards in the drawing, so that locking member 47 is slid downwards in the drawing against the biasing force of spring 49. This downwards shift of locking member 47 occurs until its lower end in the drawing abuts flange portion 461 of bearing member 46. Thus, in this condition, third abutment portion 553 of switch lever 55 is depressed by taper portion 472 of locking member 47, so that switch lever 55 is rotated in the counterclockwise direction in FIG. 6, and third abutment portion 543 of locking lever 54 comes into abutment with stop portion 473 of locking member 47.

Consequently, leaf switch 56 is put in the ON condition, and reel shaft 18 is locked in the depressed, i.e., operated condition. The lower end in the drawing of locking member 47 then depresses downwards in the drawing link portion 521 of rewind lever 52, so that entire rewind lever 52 is slid downwards in the drawing. The result of this is that gearwheels 50 and 53, still in mesh with each other, are slid downwards in the drawing, whereupon gearwheel 53 comes into mesh with gearwheel 42. Furthermore, by means of abutment portion 522 of rewind lever 52, gearwheel 41 is slid downwards in the drawing against the biasing force of spring 412, so that gearwheel 41 is brought out of mesh with gearwheel 43. The result of this is that the turning force of flywheel 33 in the counterclockwise direction in FIG. 6 is transmitted to reel cap 48 through gearwheels 35, 42, 53 and 50, and rotary shaft 181, thus causing reel cap 48 to rotate at high speed in the clockwise direction in FIG. 6, i.e., the tape rewind operation is carried out.

We shall now explain what happens when stop operating element 22 is operated, in the playback, fast forward and rewind conditions. As explained earlier, stop operating element 22 is supported on cassette holder 28, so that stop operating element 22 is freely slidable in the vertical direction in FIG. 13. However, stop operating element 22 is supported on cassette holder 28 in such a way that stop operating element 22 is prevented from sliding off upwards in FIG. 13.

Operating shaft 221 extends downwards in the drawing from the undersurface in FIG. 13 of stop operating element 22, and coil spring 222 is mounted on the lower end in the drawing of operating shaft 221. This is then mounted on the base surface of drive portion 223 having approximately conical shape. First abutment portion 541 of locking lever 54 is here pressed against taper portion 224 of drive portion 223, by means of the biasing force of spring 545 (see FIG. 6). Thus, stop operating element 22 is biased upwards in FIG. 13 by means of spring 222 towards the position in which further upwards movement is restricted. Consequently, when stop operating element 22 is operated by being depressed downwards in FIG. 13 against the biasing force of spring 222, first abutment portion 541 of locking lever 54 is shifted in the direction of the arrow in FIG. 13 by means of its taper portion 224. Locking lever 54 is therefore rotated in the counterclockwise direction in FIG. 6.

Thus, in the playback, fast forward and rewind conditions, either first drive portion 212, or locking member 37 or 47, as described above, is locked by first to third abutment portions 541 to 543 of locking lever 54. Consequently, no matter in which of the three operating conditions the tape player is, operation of stop operating element 22 results in the counterclockwise rotation in FIG. 6 of locking lever 54, the result of which is that either first drive portion 212 or locking member 37 or 47 is released and the tape player is put into the stop condition.

In this situation, when stop operating element 22 is operated by being depressed downwards in FIG. 13, its operational stroke is restricted so that stop operating element 22 is able to only move downwards through a shallow depth, such that first abutment portion 541 of locking lever 54 is not stopped by drive portion 223. Thus, stop operating element 22 is not locked in its operating position.

The tape player explained in this embodiment is provided with an automatic stop mechanism whereby the tape player is automatically brought into a stopped condition when the tape reaches its end during playback. Specifically, referring to FIGS. 6 and 9, an end portion of friction lever 58 is provided in the lower portion of gearwheel 43 in FIG. 9, with a well-known type of friction mechanism arranged between them. When gearwheel 43 is rotated, friction lever 58 is biased towards the direction of rotation. Slot 581 is formed at the other end of friction lever 58, and projecting pin 591 is freely fitted into one end portion of detection lever 59 in slot 581. Detection lever 59 is freely rotatably supported at about its middle by shaft 592 which projects from main chassis 25. One side of the other end of detection lever 59 is brought into contact with the side face of cam portion 421 provided on gearwheel 42. Pins 593 and 594 project from the other end of detection lever 59. Pin 593 is opposite to second abutment portion 542 of locking lever 54, while pin 594 is arranged to be capable of abutment with a curved operating wall formed on the flat surface portion of gearwheel 42.

Thus, in the tape playback condition, flywheel 33 and gearwheel 35, rotating in the counterclockwise direction in FIG. 6 cause gearwheels 42 and 43 to be rotated in the clockwise direction in FIG. 6. Consequently, due to the turning force of gearwheel 43, friction lever 59 is also biased in the clockwise direction about shaft 592. The other end of detection lever 59 is then in sliding contact with cam portion 421, so that detection lever 59 performs an oscillating movement about shaft 592, and a stable playback condition is continued.

When, in such a playback condition, the tape reaches its end, the rotation of reel shaft 17 is arrested, and the rotation of gearwheels 41 and 43 is also thereby arrested. Sliding then occurs between gearwheels 42 and 43. Thus, due to the stopping of rotation of gearwheel 43, a biasing force is no longer supplied to friction lever 58 and detection lever 59. However, since the rotation of gearwheel 42 continues, cam portion 421 is also rotating, so that detection lever 59 is rotated in the counterclockwise direction in FIG. 6 about shaft 592 to the extent of the maximum diameter of cam portion 59, and stops in this position. When this happens due to the rotation of gearwheel 42, the outside portion of operating wall 422 of gearwheel 42 comes to contact with pin 594 of detection lever 59, with the result that pin 594 and consequently detection lever 59 are rotated in the counterclockwise direction in FIG. 6 from the stopped position along the curved shape of operating wall 422. Pin 593 of detection lever 59 then contacts second abutment portion 542 of locking lever 54, thereby rotating locking lever 54 in the counterclockwise direction in FIG. 6. The locking of playback operating element 21 in its depressed position is thereby released, and the automatic stop operation is thereby performed.

The operation of stop slider 57 will now be explained. In FIG. 14a, stop slider 57, as explained earlier, is supported on main chassis 25 in such a way that stop slider 57 is freely slidable in the direction of the arrow in the drawing. Stop slider 57 is normally held in the intermediate position shown in FIG. 14a by means of torsion spring 577 shown in FIG. 6. Thus, projections 578 and 579 formed at both ends of stop slider 57 are positioned at the lower part in FIG. 14a of taper portions 372 and 472 of locking members 37 and 47.

Let us now assume that in this condition as shown in FIG. 14a, reel shaft 18 is pressed downwards in the ing and as explained earlier is locked in the depressed position by means of third abutment portion 543 of locking lever 54. When this happens, taper portion 472 of locking member 47 of reel shaft 18 is pressed against projection 579 of stop slider 57, so that stop slider 57 is slid to the right in FIG. 14b against the biasing force of torsion spring 577. Projection 578 of stop slider 57 is then positioned approximately contacting bearing member 36 of reel shaft 17 so that it is interposed between flange portion 361 of bearing member 36 and abutment portion 373 of locking member 37.

Consequently, in the rewind condition shown in FIG. 14b, even if an attempt is made to operate fast forward operating element 19, stop portion 373 of locking member 37 of reel shaft 17 is prevented from being pressed down to its normal depressed position, i.e., to the position in which stop portion 372 would be locked by second abutment portion 542 of locking lever 54, by abutment with projection 578 of stop slider 57. Similarly, in the fastforward condition, in which reel shaft 17 is locked by locking lever 54 in its normal depressed condition, projection 572 of stop slider 57 is pressed by taper portion 372 of locking member 37, so that stop slider 57 is slid leftwards in FIG. 14a against the biasing force of torsion spring 577. Projection 579 of stop slider 57 is then positioned in between flange portion 461 of bearing member 46 of reel shaft 18 and stop portion 473 of locking member 47. Consequently, even if an attempt is made to operate rewind operating element 20 in the fast forward condition, stop portion 473 of locking member 47 of reel shaft 18 contacts projection 579 of stop slider 57, preventing operating element 20 from being pressed into its normal depressed position.

If an attempt is made to operate fast forward and rewind operating elements 19 and 20 simultaneously, both reel shafts 17 and 18 will be pressed down, but taper portions 372 and 472 of locking members 37 and 47 will then grip stop slider 57, so that both reel shafts 17 and 18 are prevented from reaching their normal depressed positions. That is, reel shafts 17 and 18 are able to be locked in their depressed positions when only one of them is selectively depressed. Thus, the simultaneous operation of both fast forward and rewind operating elements 19 and 20 is prevented.

Assembly of the tape player mechanism as described above is therefore extremely easy, since first of all, operating shaft 24 in lid 24, which is provided for the purpose of supporting fast forward and rewind operating elements 19 and 20, is inserted as shown in FIG. 3, through hole 128 formed in side portion 125 of lid 12, and then introduced into the interior of lid 12. It is apparent that if support shaft 24 were to be fitted, as shown in FIG. 3, in lid 12, but without providing hole 128, the construction of bearings 191 to 197 and 201 to 207 would become complicated, making the assembly difficult.

Another consideration is that lid 12 is intended to be compact, and its interior must therefore be made of almost exactly the same size as tape cassette 13, so that the space for provision of the support mechanism for mounting fast forward and rewind operating elements 19 and 20 is very restricted. That is to say, a support mechanism is required which has a high "space factor" which permits it to be released in a small space. Thus, as shown in FIG. 3, a high space factor is achieved with a very simple construction and assembly by simply providing bearing portions 191 to 197 and 201 to 207 with holes through which support shaft 24 is able to be inserted. Although in FIG. 3, holes 128 and 129 are formed in both of side portions 125 and 127 of lid 12, the holes could of course be formed in one side only.

Furthermore, the simultaneous actuation of both reel shafts 17 and 18 is simply prevented by the provision of stop slider 57 between two reel shafts 17 and 18. Thus, this function is achieved in a reliable way by a very simple construction. This is conducive to miniaturization of the tape player while yet affording it sufficient protection.

FIG. 15 shows the configuration of reel caps 38 and 48. Blades 381 and 481, approximately diamond-shaped in side view, are formed on the outer surface of approximately cylindrical reel caps 38 and 48. Blades 381 and 481 are able to abut with projections of reel hubs on tape cassettes for the purpose of transmitting the turning force of reel caps 38 and 48 to the reel hubs. The projections (in the case of an ordinary compact tape cassette, six such projections for each reel hub) project peripherally inwardly from the reel hubs on.

The operation of blade 381 of reel cap 38, for example, will be explained with reference to FIG. 16. The operation of blade 481 is the same as that of reel cap 38, so an explanation of blade 481 is omitted. Assuming that the arrow G in the drawing, is in the direction of fast forward rotation, one of inclined portions 382 on the lower part of blade 381 in the drawing presses against projection 383 (shown by the double-dotted chain line in the drawing) formed on the reel hubs of the tape cassette, thus rotating the reel hub.

When the tape reaches its end in the fast forward condition, the rotation of the reel hub is stopped, so that inclined portion 382 of blade 381 of reel cap 38 presses against projection 383, causing the rotation of reel cap 38 to be stopped. As explained earlier, when stop operating lever 22 is operated, second abutment portion 542 of locking lever 54 separates from stop portion 373 of locking member 37, so that reel cap 38 shifts upwards in FIG. 16 due to the biasing force of spring 30 shown in FIG. 9.

When inclined portion 382 of reel cap 38 presses against projection 383, as caused by the driving of reel cap 38 during playback or fast forward, or by the resistance of the tape during rewind or at the end of the tape, the resistance of the tape causes projection 383 to produce a lifting force Ps1 on reel cap 38 itself, the lifting force Ps1 being directed upwards in FIG. 16. The lifting force Ps1 is produced by resolving the true force Pv1 which acts on reel cap 38 when projection 383 presses against inclined portion 382 into a force P1 acting in the direction of rotation of reel cap 38, and the lifting force Ps1. If the torque of rotation of reel cap 38 is T1 and the radius of blade 381 is r1, we have the relationship:

$$P1 = \frac{T1}{r1}$$

and if the angle of inclined portion 382 with respect to the vertical indicated by the single-dotted chain line in FIG. 16 is $\beta 1$, the lifting force Ps1 is given by:

$$Ps1 = P1 \times \tan\beta 1 = \frac{T1}{r1} \times \tan\beta 1$$

Consequently, the biasing force spring 39 and the lifting force Ps1 act on reel cap 38, so that it is reliably returned to its original position. Conventional reel cap blades suffered from the problem of erroneous operation since they did not have an inclined part as described above. This meant that when the tape reached its end and the blade pressed too strongly on reel hub projection 383, in some cases reel cap 38 would not be returned to its original position simply by the biasing force of spring 39, even though stop operating element 22 was depressed, thus resulting in erroneous operation.

However, by forming inclined portion 382 on blade 381 as mentioned above, reel cap 38 is able to be reliably returned to its original position. Moreover, since it is unnecessary for the spring to provide a very strong biasing force, the operating force required to depress fast forward operating element 19 is able to be made small. Further, if blade 381 is made diagonal in shape as shown in FIG. 16, reel cap 38 is able to be made interchangeable with the other reel cap 48. That is, it is able to be used as the reel cap of either of reel shafts 17 or 18.

Other possibilities for the shape of blades 381 and 481 of reel caps 38 and 48 are shown in FIGS. 17a to 17c. FIGS. 17a and 17c show the shape of reel cap 38 and FIG. 17b shows the shape of reel cap 48. In this case also, the explanation will be mainly directed to reel cap 38. In approximately the lower half in the drawing, blade 381 of reel cap 38 projects with an inclination such that it is approximately tangential to the peripheral side face of reel cap 38. This projecting face comprises perpendicular portion 384 formed parallel to the center line of reel cap 38, and in approximately its upper half in FIG. 17a, inclined portion 382 having an angle with respect to the center line. Reel cap 48 is formed with perpendicular portion 484 and inclined portion 482, similar to perpendicular portion 384 and inclined portion 382 of reel cap 38, but directed in the opposite direction to the corresponding portions on reel cap 38.

Thus, in the fast forward condition, inclined portion 382 presses against projecting portion 383 of reel hub (not shown in FIG. 17), causing the tape to run. When the tape reaches its end, as mentioned earlier, a lifting force is produced by the action of inclined portion 382, causing reel cap 38 to return in the upwards direction in FIG. 17a. This results in perpendicular portion 384 of reel cap 38 becoming opposite to projection 383 of the reel hub. Consequently, when stopped, the reel hub becomes easier to release from reel cap 38 than when projection 383 is opposite to inclined portion 382, and the tape cassette is therefore easier to remove. Further, if these are molded of, for example, synthetic resin, removal of reel caps 38 and 48 from the mold is also facilitated when they are shaped as shown in FIGS. 17a–17c.

Apart from that described above, blades 381 and 481 of reel caps 38 and 48 may of course have the shapes shown in FIGS. 18 and 19a and 19b. Practically, it is desirable that the angle $\beta 1$ of inclined portions 382 and 482 of blades 381 and 481 be about 18°.

It is a feature of this invention that, as explained above, the inclined portion is formed on the blade of the reel cap which produces a lifting force in the upwards direction so as to cause the reel shaft to return to its original position when the tape is stopped.

Next, as shown in FIG. 20, the teeth of gearwheels 35, 40, 42, 50 and 53 are inclined to form what are called helical gears. These are formed with the same object as inclined portions 382 and 482 above, namely that when the tape reaches its end, a lifting force should cause reel caps 38 and 48 to return to their original positions. The operation of these will be explained, the description referring mainly to reel cap 38. Let us assume that, in FIG. 21, gearwheel 42 receives turning force from flywheel 33 and rotates in the direction of the arrow H in the drawing, thereby rotating reel cap 38 in the direction of the arrow G in the drawing.

Thus, the apparatus is in the fast forward condition. When in the fast forward condition, the tape reaches the end, the rotation of reel hub is stopped, so that the rotation of reel cap 38 and gearwheel 40 is stopped. Thus, when stop operating element 22 is operated, reel cap 38 is returned upwards in FIG. 21 by the biasing force of spring 39. Since a turning force is transmitted from flywheel 33 to gearwheel 42, a lifting force Ps2, upwards in FIG. 21, is produced by the inclination of the teeth of gearwheels 40 and 42. This lifting force Ps2 is produced by resolving the true force Pv2, which acts on gearwheel 40 when reel cap 38 stop rotating, into a force P2 which acts in the direction of rotation of gearwheel 40 and the lifting force Ps2. That is, if we let the rotational torque of gearwheel 40 to be T2, and the radius of gearwheel 40 be r2, we have the relationship:

$$P2 = \frac{T2}{r2}$$

and if we let the helix angle of the threads of the helical teeth of gearwheel 40 to be $\beta 2$, the lifting force Ps2 is given by:

$$Ps2 = P2 \times \tan\beta 2 = \frac{T2}{r2} \times \tan\beta 2$$

Reel cap 38 is therefore subjected to the biasing force due to spring 39 and to the lifting forces Ps1, Ps2 and is therefore more positively returned. A similar explanation to the above applied to reel cap 48 during the rewind operation.

Figure 22:
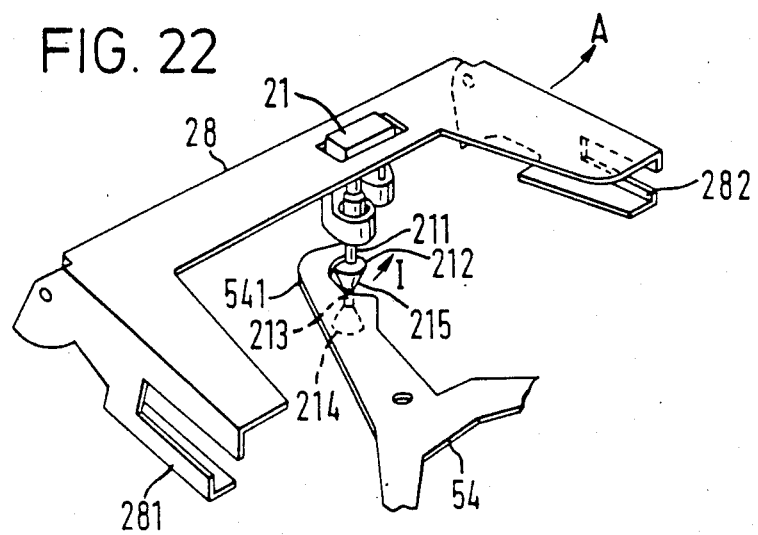
FIG. 22 is a perspective view showing the relationship between the playback operating element and the locking lever.

The relationship between first drive portion 212 of playback operating element 21 and first abutment portion 541 of locking lever 54 is shown in FIG. 22. In the condition in which playback operating element 21 is locked in the operating position, first abutment portion 541 of locking lever 54 abuts the base surface of first drive portion 212 of playback operating element 21 on the side at which cassette holder 28 pivots. Thus, when lid 12 is opened while the unit is playing back, cassette holder 28 rotates in the direction of the arrow A in FIG. 22, so that playback operating element 21, which is supported on cassette holder 28, is shifted in the same direction. The result of this is that first drive portion 212, which is integral with playback operating element 21, shifts to separate from first abutment portion 541 of locking lever 54, i.e., in the direction of the arrow I in the FIG. 22, thereby returning playback operating element 21 to the non-depressed position.

Damage to the tape when lid 12 is inadvertently opened during operation is prevented, since the tape player is automatically stopped. If this feature was not provided, pinch roller 30 would be pressed against capstan 26 with the tape therebetween, and the movement of the tape cassette and pinch roller 30 with cassette holder 28 would result in the tape being damaged by having to slide between pinch roller 30 and capstan 26. However, the problem is resolved by automatically stopping the tape player so that pinch roller 30 is separated from capstan 26 when lid 12 is opened during playback.

First drive portion 212 of playback operating element 21 is arranged, by means of operating shaft 211, with the prescribed separation from the center of rotation of cassette holder 28. Consequently, even if lid 12 is opened only slightly, the amount of movement of first drive portion 212 in the direction of the arrow I in FIG. 22 is considerable, so that the playback operating element 21 is reliably released and the tape is protected. In this connection, it should be mentioned that some conventional tape players have provision for releasing the playback operating element by linkages connected to the lid when the lid opened. However, in this conventional tape player mechanism, the playback operating element is provided on a cabinet, not on the cassette holder, and release of the playback operating element is therefore carried out through a lock releasing member that is linked to the opening action of the cassette holder. This requires the provision of a member exclusively for lock release, making the construction more complicated, reducing the compactness of the tape player. Moreover, in such tape players, the playback operating element is not released until the lid is almost fully opened.

However, with the construction of FIG. 22, playback operating element 21 is provided on cassette holder 28 and playback operating element 21 is moved in a manner which is linked to the action of opening cassette holder 28 to release locking. The construction is therefore simpler and so more compact than the use of a separate locking release member, such as was required in conventional tape players. Moreover, locking is released even by a slight opening of lid 12, so that the tape is protected in a reliable manner.

Figure 23A:
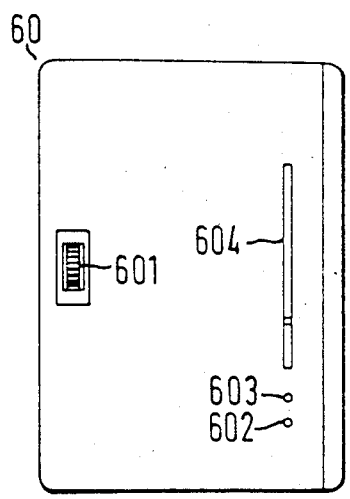
FIGS. 23a and 23b are a front view and a back view of the tuner pack.
Figure 23B:
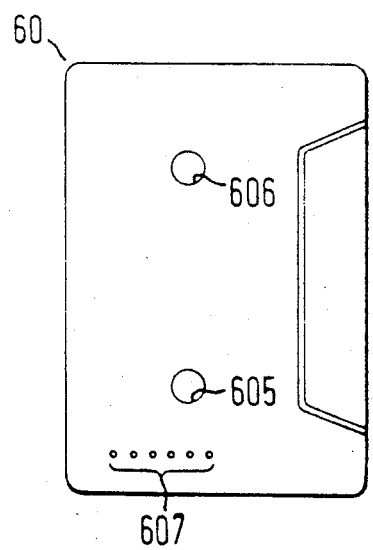

FIGS. 23a and 23b show tuner pack 60 referred to above. FIG. 23a shows the side of tuner pack 60 which faces lid 12, and FIG. 23b shows the side of tuner pack 60 facing main chassis 25. On the face of tuner pack 60 that is opposite lid 12 there are provided tuning controller 601 which is operable from outside by its positioning in slot 121 (see FIG. 1) formed in lid 12. Also provided are tuning indicator 602, frequency band indicator 603, and frequency dial 604. These are visible through window 23 of lid 12. On the other face of tuner pack 60, there are provided recesses 605 and 606 to accommodate reel shafts 17 and 18 when tuner pack 60 is fitted in tape cassette holding part 14, and several connection terminals 607 for supplying the received signal, after reception, tuning, detection and amplification etc., by tuner pack 60, to the tape player.

Figure 24:
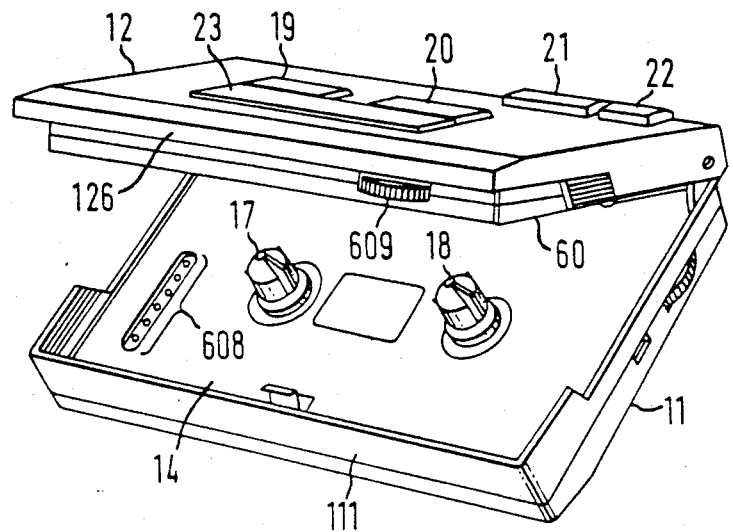
FIG. 24 is a perspective view showing how the tuner pack is fitted into the cassette holder.

As shown in FIG. 24, tuner pack 60 is able to be supported on cassette holder 28 (not visible in FIG. 24), like the tape cassette, after opening lid 12. By closing lid 12, connection terminals 607 are connected to connection terminals 608 in cabinet 11 so that the received signal is fed to the circuitry in cabinet 11. Tuner pack 60 is also provided with frequency band changeover switch 609 on its side (as seen in FIG. 24) facing side 126 of lid 12 which is the outer side when lid 12 is opened. This greatly facilitates handling in that frequency band changeover switch 609 is able to be operated easily be opening lid 12, without need to remove tuner pack 60 from cassette holder 28. Further, a better appearance of the tape player is obtained. If required, a notch may be formed in side 111 of cabinet 11 opposite to frequency band changeover switch 609, so that frequency band changeover switch 609 is able to be operated from outside with lid 12 closed.

The operability of conventional tape players employing tuner packs has been poor in that a frequency band changeover switch was provided on a flat face of the tuner pack so that the switch could not be operated without taking the tuner pack out of a cassette holder. It is possible to provide a hole on a lid for insertion of a frequency band changeover switch of a tuner pack so that the switch is able to be operated from outside. However, there is a problem when the tape cassette is used in that the appearance of the tape player is impaired.

The switch which is arranged at the side of tuner pack 60 need not necessarily be frequency band changeover switch 609 but could be any other of the operating elements (for example, the tuning controller etc.) provided for the reception of radio waves.

Figure 25:
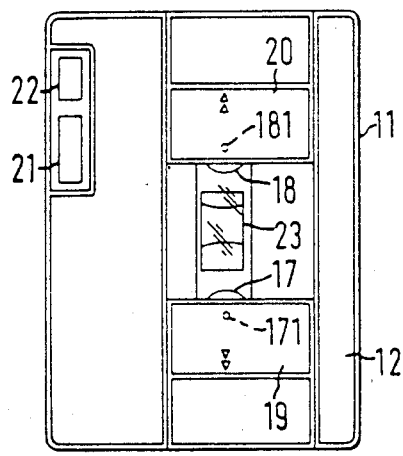
FIG. 25 and FIG. 26 are front views showing the external appearance of other tape players constituting different embodiments of the present invention.
Figure 26:
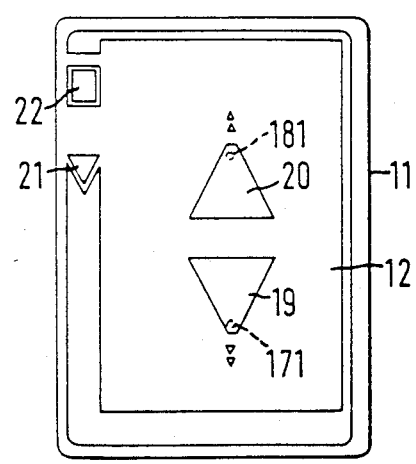

FIGS. 25 and 26 show embodiments of the tape player described above having a different external appearance and shape. Parts which are the same as those described above are given the same reference numerals and a detailed explanation thereof is omitted.

Figure 27:
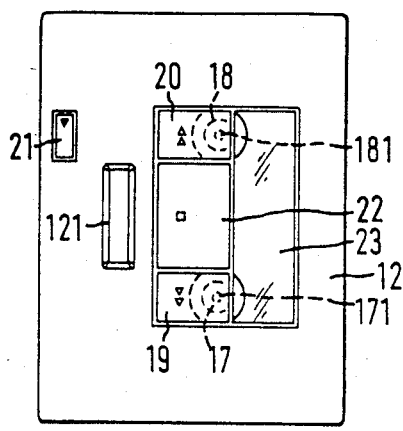
Figure 28:
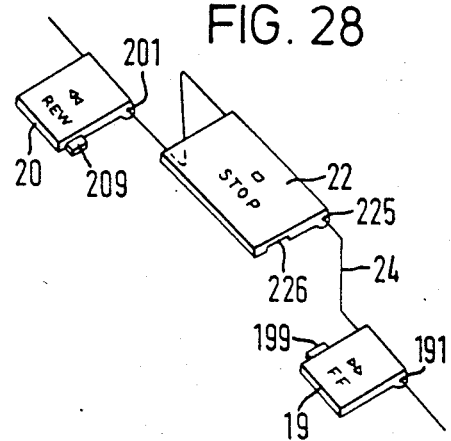
FIG. 28 is a disassembled perspective view showing operating elements of FIG. 27.

FIGS. 27 and 28 show an embodiment of the tape player with a stop mechanism different from the above embodiment. As seen from the front view of the tape player of lid 12 shown in FIG. 27, stop operating element 22 is arranged between fast forward operating element 19 and rewind operating element 20, not the neighborhood of playback operating element 21. Stop operating element 22 is mounted in an opening of the center of lid 12, together with fast forward and rewind operating elements 19 and 20 on both sides of stop operating element 22. These three elements 19, 20 and 22 are substantially rectangular plates, at ends of which are formed bearings 191, 201 and 225. Support shaft 24 (which is shown by a typical crank line in FIG. 28 but is the same as support shaft 24 of FIG. 3) is passed through these bearings 191, 201 and 225, and both ends of support shaft 24 are supported by bearings 193, 195, 206 and 207 (see FIG. 3) of lid 12, thereby making it possible to mount operating elements 19, 20 and 22.

Projections 199 and 209 are provided at the sides of fast forward and rewind operating elements 19 and 20 adjacent to stop operating element 22 as shown in FIG. 28. Recesses 226 (only one recess 226 is shown in FIG. 28) are formed on both sides of stop operating element 22 at positions opposite to projections 199 and 209, and thus engage projections 199 and 209. As a result, when stop operating element 22 is pressed down by the user, fast forward and rewind operating elements 19 and 20 are together pressed down by stop operating element 22. However, the distance that fast forward and rewind operating elements 19 and 20 may be depressed is restricted by means of stop slider 57 (see FIG. 14a), as compared to when fast forward operating element 19 or rewind operating element 20 is operated alone.

During playback, fast forward and rewind operations, first driving portion 212 of playback operating element 21 and locking members 37 and 47 of reel shafts 17 and 18 are respectively locked by first to third abutment portions 541, 542 and 543 of locking lever 54 (see FIG. 6). When stop operating element 22 shown in FIGS. 27 and 28 is pressed down, fast forward and rewind operating elements 19 and 20 are pressed down together by stop operating element 22 for the restricted distance as mentioned above. As both reel shafts 17 and 18 slide downwards in FIG. 14a, either one or both of tapered surfaces 372 and 472 of locking members 37 and 47 push second and third abutment portions 542 and 543 of locking lever 54 despite the fact that the tape player is in any one of the three operating conditions, so that locking lever 54 is rotated in the counterclockwise direction in FIG. 6. Therefore, the tape player stops no matter which of the three operating conditions the tape player had been in.

Since projections 578 and 579 of stop slider 57 are pushed by tapered surfaces 372 and 472 of locking members 37 and 47 of reel shafts 17 and 18 when reel shafts 17 and 18 are pressed down by stop operating element 22, stop slider 57 becomes centered as in FIG. 6. As the consequence, both reel shafts 17 and 18 cannot be operated to a deep position as compared to when they are operated alone. When both reel shafts 17 and 18 assume this shallow position, locking members 37 and 47 are not locked together with second and third abutment portions 542 and 543 of locking lever 54. Thus, neither reel shaft 17 nor 18 are locked in an operative position, even if stop operating element 22 is operated. In other words, the operative stroke of stop operating element 22 is short in comparison with the case where fast forward or rewind operating element 19 or 20 is operated alone.

Figure 29:
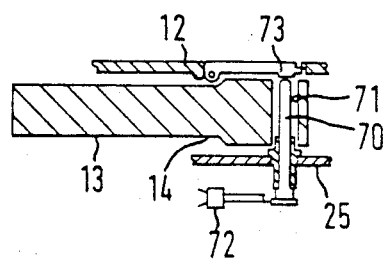
FIG. 29 is an explanatory view of the pause operating mechanism.

FIG. 29 illustrates a pause operating member 70 mounted using opening or hole 71 which is one of a pair of holes typically found in tape cassettes such as cassette 13 designed for passing therethrough capstans of tape players. When tape cassette 13 is mounted in tape cassette holding portion 14 (see FIG. 1b), capstan 26 passes through the one of the pair of holes for capstans (which is not shown in the drawing but is the same as hole 71 of FIG. 29), and pause operating member 70 passes through hole 71 which is the other of holes for capstans. Pause operating member 70 is slidable along hole 71, and is connected to a well known push-pull mechanism, at the lower portion in the drawing, of main chassis 25. At the same time, member 70 is in engagement with leaf switch 72. In addition, pause operating element 73 is provided in lid 12 in the same way as the other operating elements 19, 20 and the like.

If pause operating element 73 is depressed, pause operating member 70 is pressed downwards in the drawing and locked in that position. At this time, leaf switch 72 is turned off, so that the supply of the electric power to motor 27 is stopped, and the tape feed is stopped. If pause operating element 73 is pressed again while in this condition, the lock on pause operating member 70 is released, so that leaf switch 72 is turned to the original ON condition. Thus, the tape feed is started again.

Figure 30:
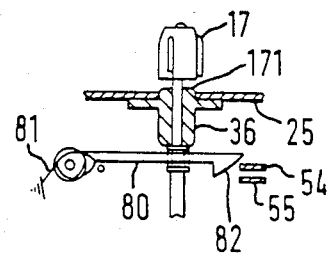
FIG. 30 is a side view in cross section showing the modified example of the reel shaft portion.

FIG. 30 illustrates an alternate construction for locking reel shafts 17 and 18 in the depressed position, and at the same time, for turning on leaf switch 56. An explanation will be given with respect to reel shaft 17 and an identical arrangement may be employed for reel shaft 18. Reel shaft 17 is rotatably supported by bearing 36 mounted on main chassis 25. One end of locking member 80 engages the lower portion in the drawing of reel shaft 171. The other end of locking member 80 is rotatably supported and biased in the direction which is counterclockwise in the drawing by torsion spring 81. Tapered surface 82 is formed on locking member 80 as shown in the drawing at one end thereof. If reel shaft 17 is depressed, locking member 80 is rotated in the clockwise direction. At this time, locking lever 54 and switch lever 55 (see FIG. 6) are pushed by tapered surface 82 so that they are rotated. In addition, locking lever 54 is in engagement with the upper surface of locking member 80 when locked, so that reel shaft 17 is locked in the depressed position.

Figure 31:
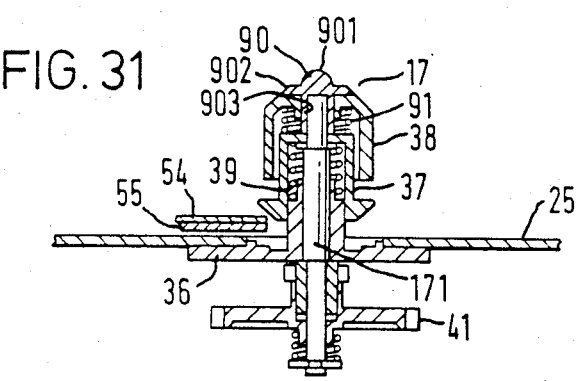
FIG. 31 is a side view in cross section showing further modification of the reel shaft portion.

FIG. 31 shows a further modification of reel shaft 17 in that reel cap 38 is slidably mounted along the axis of reel shaft 17. The rest of reel shaft 17 is equivalent with the above embodiments, so that an explanation of FIG. 31 will concentrate on reel cap 38 and parts directly related to reel cap 38.

As shown in FIG. 31, reel cap guide 90 is fixed to the upper end of rotary shaft 171 of reel shaft 17. Reel cap guide 90 has round top portion 901, flange portion 902 and cylindrical portion 903 by which reel cap guide 90 attaches to rotary shaft 171. The lower end of cylindrical portion 903 of reel cap guide 90 is in contact with the base portion of locking member 37. Therefore, when round top portion 901 of reel cap guide 90 is depressed downwards in the drawing by fast forward operating element 19, locking member 37 is depressed downwards in the drawing together with reel cap guide 90 and rotary shaft 171. Reel cap 38 is slidably mounted to cylindrical portion 903 of reel cap guide 90 along the axis of cylindrical portion 903. Reel cap 38 is biased upwards in the drawing by coil spring 91 mounted between the base portion of locking member 37 and the base portion of reel cap 38, but reel cap 38 cannot be removed from reel shaft 17 by flange portion 902 of reel cap guide 90. The rotational movement of reel cap 38 is restricted by means of frictional engagement with reel cap guide 90. Therefore, reel cap 38 rotates in accordance with the rotation of reel shaft 17.

The operation of FIG. 31 is as below. When the projections 383 of the reel hub of the tape cassette 13 (not shown) accidentally meet the blades of reel cap 38 in the course of loading tape cassette 13 into tape cassette loading part 14 of the tape player, only reel cap 38 is depressed. This prevents rotary shaft 171 and locking member 37 from being erroneously depressed due to engagement with the projections of the reel hub of tape cassette 13. Reel cap 38 returns to its upward position in the drawing by the biasing force of coil spring 91 when reel shaft 17 is energized to rotate, since the blades of reel cap 38 are out of mesh with the projections of the reel hub of tape cassette 13. Then reel cap 38 is able to rotate the reel hub of tape cassette 13. As a result, erroneous operation of the tape is prevented.

Therefore, since various operating elements are provided in lid 12 itself, it becomes possible to enlarge the size of the operating elements and arrange those operating elements over a large space. Thus, the operating efficiency is greatly enhanced while the tape players remain small. In this case, it is also acceptable if the above-mentioned various operating elements are molded integrally with lid 12. Then, the portion of lid 12 which becomes the operating element should be made thin so as to be elastic, thereby making it possible to be depressed by pressing. Furthermore, since the operating elements pass through various kinds of openings or holes (the holes through which capstans may pass, the holes through which guide pins may pass and the holes through which reel shafts 17 and 18 may pass) which are formed in the direction of the thickness of tape cassette 13, it is possible to select operations from adjacent to a surface of tape cassette 13. Thus, it is not necessary to provide spaces for putting the operating elements within cabinet 11, which contributes to enabling the tape player to be of small size.

In addition, since reel shafts 17 and 18 are utilized as the operating members movable in an axial direction, the construction is integrated, thereby making it possible to ensure reliable operation. Furthermore, since reel shafts 17 and 18, which are on the take-up side during both fast forwarding and rewinding, may be actuated for the fast forward and rewind operations, erroneous operations are avoided and operative efficiency is enhanced. Furthermore, since reel caps 38 and 48 and locking members 37 and 47 are provided coaxially and separately for reel shafts 17 and 18, unnecessary side pressure such as the energizing force of the spring from the mechanism side of the tape player is not applied to reel caps 38 and 48, so that the tape can feed stably.

This invention is not restricted to the above embodiments but is able to be put into practice in various modified ways without departing from its essence.

What is claimed is:

1. Apparatus for driving a cartridge tape, said cartridge tape including at least one reel having a reel hole therethrough and tape wound on said reel, and a housing defining a guide hole therethrough different from said reel hole, said apparatus comprising:

means adapted for receiving said cartridge tape;

a moving member adapted for rotating said reel, said moving member being mounted on said receiving means;

means for driving said moving member; and manually actuatable means for preventing said driving means from driving said moving member, said preventing means including a manual actuating member extending through said guide hole when said cartridge tape is located on said receiving means, said actuating member preventing said driving means from driving said moving member when said actuating member is manually actuated.

2. A cartridge tape driving apparatus according to claim 1, wherein said actuating member is slidable along said guide hole when said cartridge tape is located on said receiving means.

* * * * *